(12) United States Patent
Gray et al.

(10) Patent No.: US 10,491,386 B2
(45) Date of Patent: Nov. 26, 2019

(54) SLICE-LEVEL KEYED ENCRYPTION WITH SUPPORT FOR EFFICIENT REKEYING

(71) Applicant: International Business Machines Corporation, Armonk, NY (US)

(72) Inventors: Adam M. Gray, Chicago, IL (US); Wesley B. Leggette, Chicago, IL (US); Jason K. Resch, Chicago, IL (US); Mark D. Seaborn, Algonquin, IL (US)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 15/611,325

(22) Filed: Jun. 1, 2017

(65) Prior Publication Data

US 2018/0351740 A1 Dec. 6, 2018

(51) Int. Cl.
*H04L 9/08* (2006.01)
*H04L 9/14* (2006.01)
*H04L 29/08* (2006.01)
*H04L 29/06* (2006.01)

(52) U.S. Cl.
CPC .......... *H04L 9/0891* (2013.01); *H04L 9/0861* (2013.01); *H04L 9/14* (2013.01); *H04L 63/0478* (2013.01); *H04L 67/1097* (2013.01)

(58) Field of Classification Search
CPC ........ H04L 9/0891; H04L 9/0894; H04L 9/16
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | MacKay et al. |
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Oleg Korsak
(74) *Attorney, Agent, or Firm* — Garlick & Markison; Timothy W. Markison; Timothy D. Taylor (57) ABSTRACT

A method begins by determining an encryption change regarding one or more sets of encrypted encoded data slices stored in storage units of a dispersed storage network (DSN). The method continues by updating an encryption file to include information regarding one or more of level of encryption, new encryption keys, new encryption key identifiers, and previous encryption file information. The method continues by dispersed storage error encoding the updated encryption file to produce a set of encoded encryption file slices (EEFSs) and outputting the set of EEFSs to a set of storage units of the DSN. The method continues by retrieving EEFSs from the set of storage units, recovering the updated encryption file from the EEFSs. The method continues by re-encrypting the encrypted encoded data slice based on the new encryption key to produce a re-encrypted encoded data slice and storing the re-encrypted encoded data slice in the storage units.

20 Claims, 8 Drawing Sheets

(56) References Cited

U.S. PATENT DOCUMENTS

| | | | |
|---|---|---|---|
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma et al. |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0229069 | A1 | 10/2005 | Hassner |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters, III et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2012/0311557 | A1* | 12/2012 | Resch .............. G06F 21/6218 717/171 |
| 2014/0040417 | A1* | 2/2014 | Gladwin ............ G06F 11/2053 709/214 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 1511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

FIG. 1
distributed, or dispersed, storage network (DSN) 10

SLICE-LEVEL KEYED ENCRYPTION WITH SUPPORT FOR EFFICIENT REKEYING

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

DETAILED DESCRIPTION OF THE INVENTION

Figure 1:
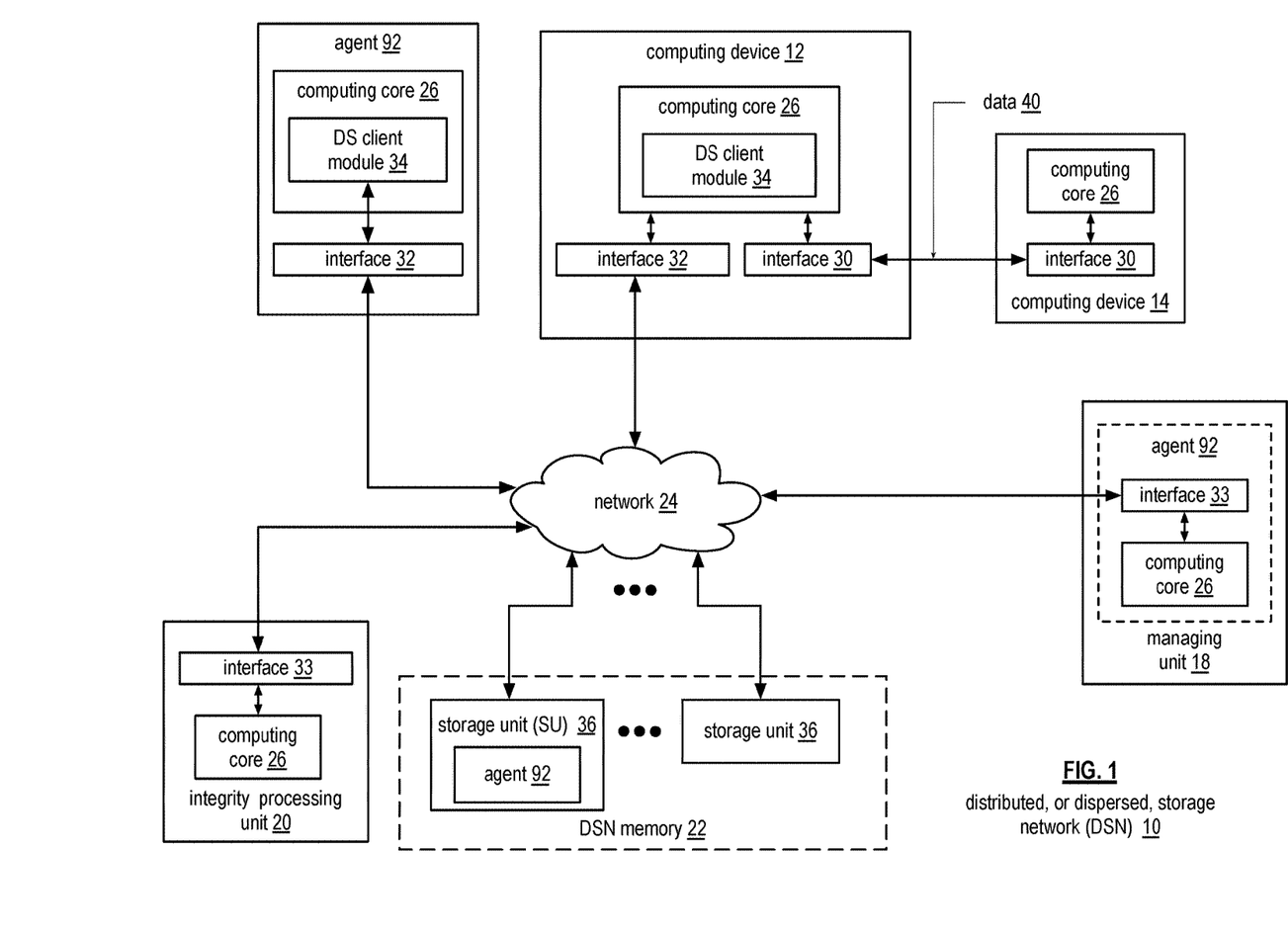
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-14, an agent 92, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36.

Figure 2:
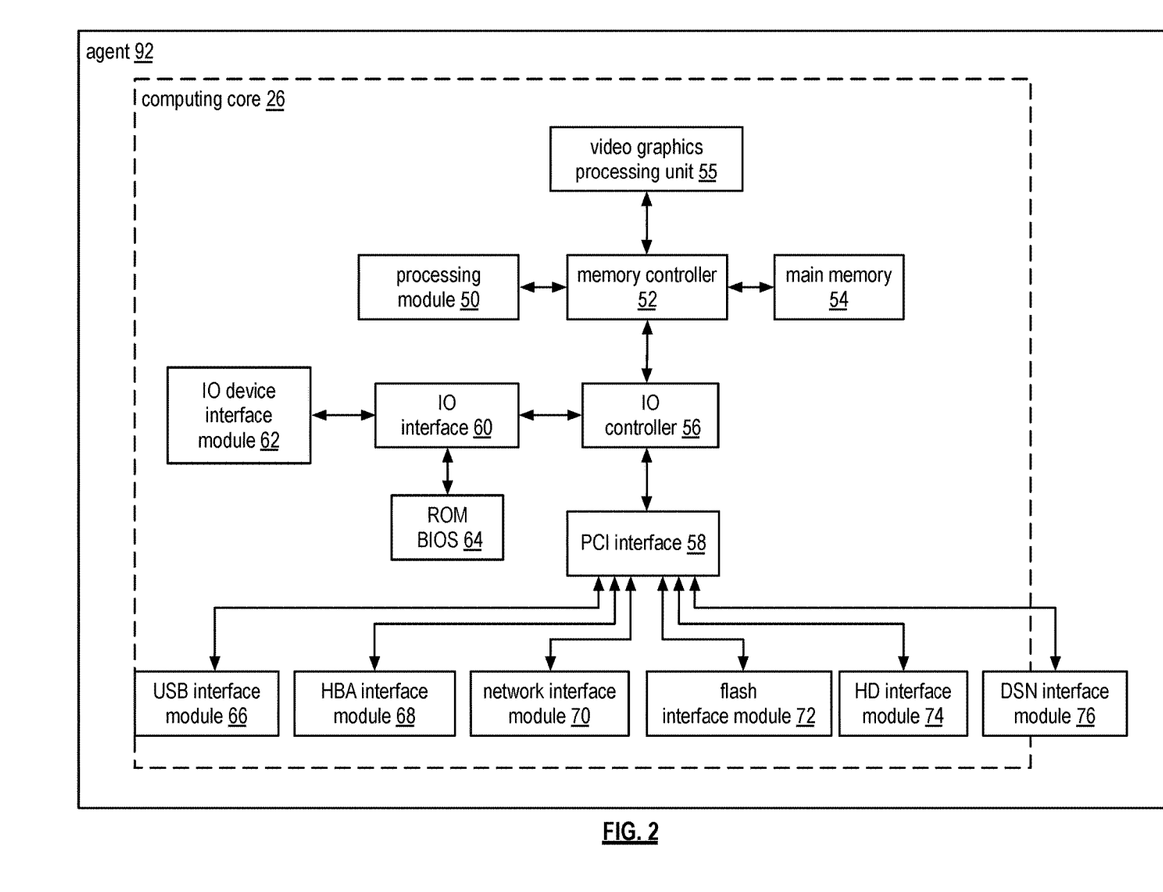
FIG. 2 is a schematic block diagram of an embodiment of a computing core in accordance with the present invention.

Further note that each storage unit 36 includes a computing core (as shown in FIG. 2, or components thereof) and a plurality of memory devices for storing dispersed error encoded data. Still further note that the integrity processing unit 20, the managing unit 18 and a storage unit 36 may include an agent module 92. Each of the computing devices 12-14, the agent 92, the managing unit 18, and the integrity processing unit 20 include a computing core 26, which includes network interfaces 30-33. Computing devices 12-14 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and agent 92 and the DSN memory 22. As yet another example, interface 33 supports a communication link for each of the managing unit 18 and the integrity processing unit 20 to the network 24. Computing devices 12 and agent 92 include a dispersed storage (DS) client module 34, which enables the computing device to dispersed storage error encode and decode data (e.g., data 40) as subsequently described with reference to one or more of FIGS. 3-11. In this example embodiment, computing device 12 functions as a dispersed storage processing agent for computing device 14. In this role, computing device 12 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-14, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 (e.g., of agent module 92, of a computing device 12-14, of a storage unit 36, etc.) that includes a processing module 50, a memory controller 52, main memory 54, a video graphics processing unit 55, an input/output (TO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

Figures 3, 4:
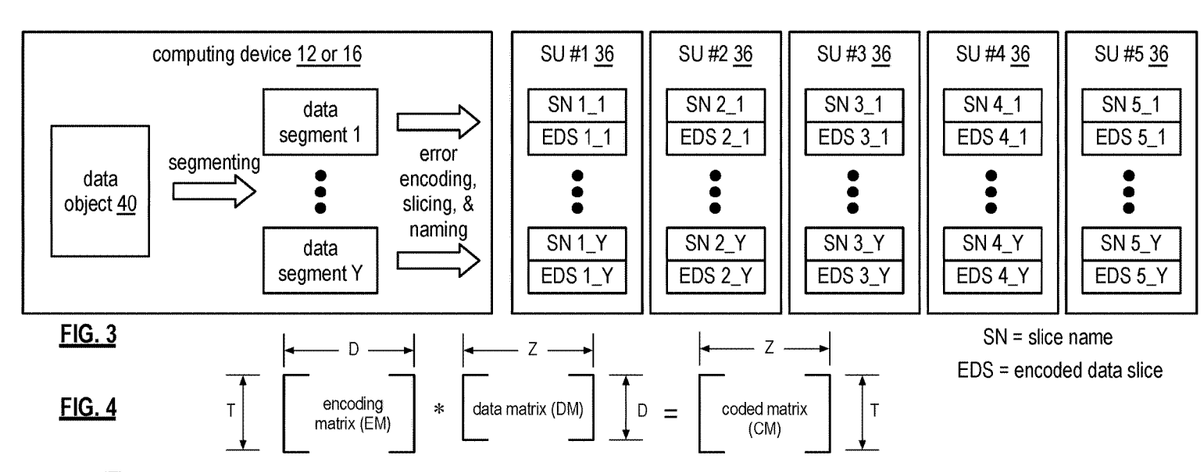
FIG. 3 is a schematic block diagram of an example of dispersed storage error encoding of data in accordance with the present invention.
FIG. 4 is a schematic block diagram of a generic example of an error encoding function in accordance with the present invention.

FIG. 3 is a schematic block diagram of an example of dispersed storage error encoding of data. When a computing device 12 or an agent module 92 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

Figure 5:
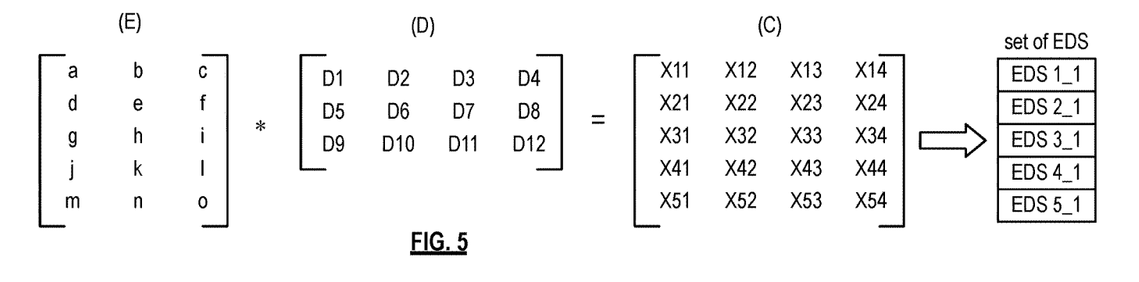
FIG. 5 is a schematic block diagram of a specific example of an error encoding function in accordance with the present invention.

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or an agent 92 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol. The computing device 12 or an agent 92 then disperse storage error encodes a data segment using the selected encoding function (e.g., Cauchy Reed-Solomon) to produce a set of encoded data slices.

FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Figure 6:
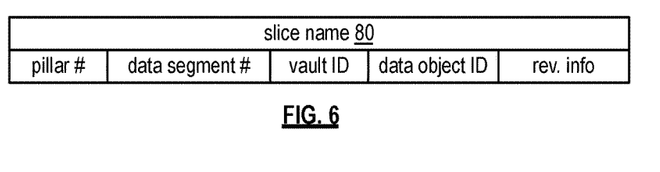
FIG. 6 is a schematic block diagram of an example of a slice name of an encoded data slice (EDS) in accordance with the present invention.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

Figure 7:
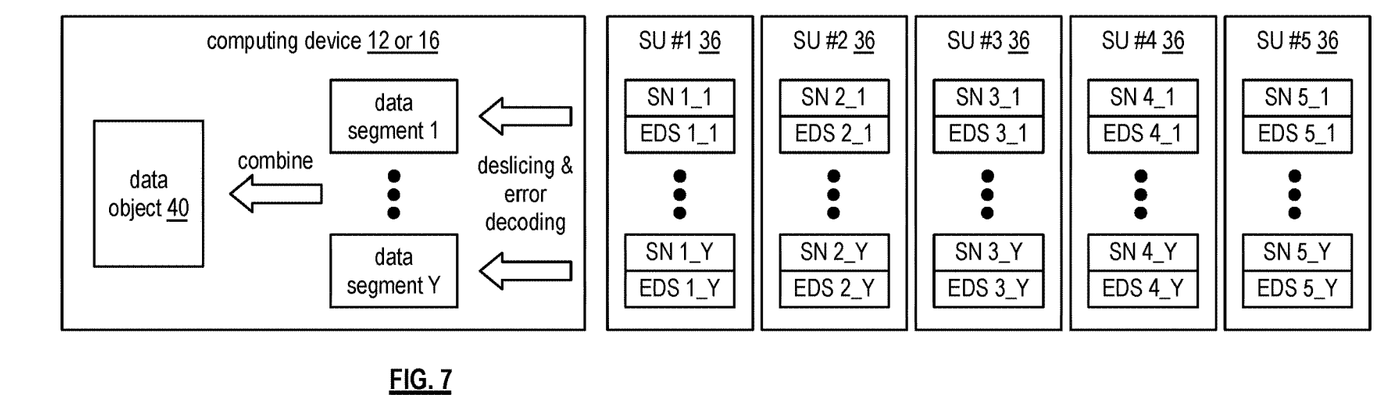
FIG. 7 is a schematic block diagram of an example of dispersed storage error decoding of data in accordance with the present invention.

As a result of encoding, the computing device 12 or an agent 92 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y. FIG. 7 is a schematic block diagram of an example of dispersed storage error decoding of a data object that was dispersed storage error encoded and stored in the example of FIG. 4. In this example, the computing device 12 or an agent module 92 retrieves from the storage units at least the decode threshold number of encoded data slices per data segment. As a specific example, the computing device retrieves a read threshold number of encoded data slices.

Figure 8:
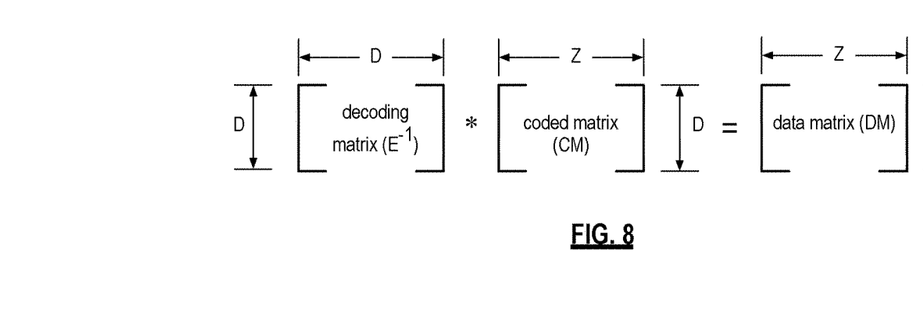
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9A:
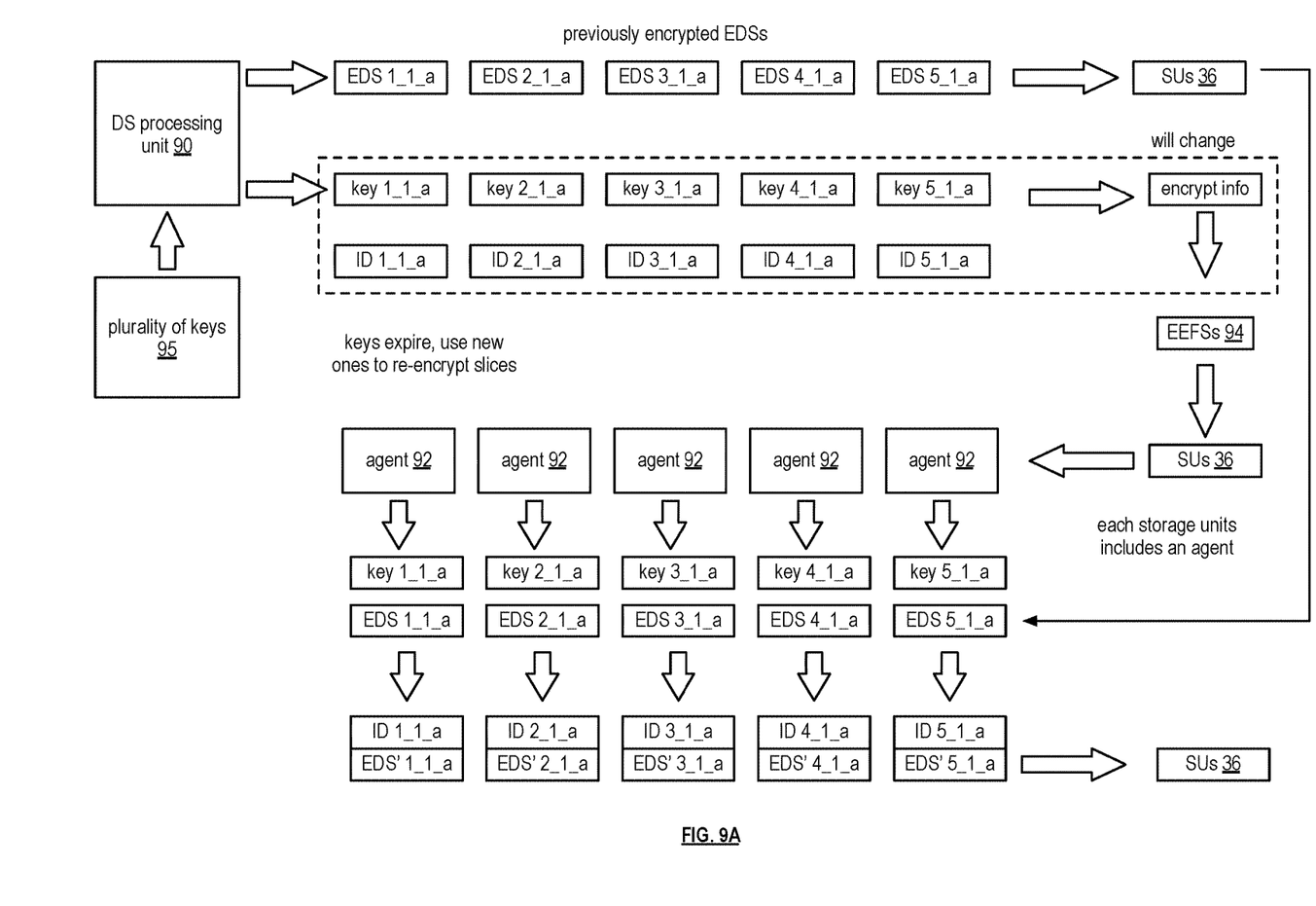
FIG. 9A is a schematic block diagram of an embodiment of re-encrypting encoded data slices within a dispersed storage network (DSN) in accordance with the present invention.

FIG. 9A is a schematic block diagram of previously encrypted encoded data slices and re-encrypted encoded file slices within a dispersed storage network (DSN). The DSN includes a DS processing unit 90, storage units 36, and a set of agents 92. Each agent 92 may be a stand-alone computing device or a module operable within one or more of a storage unit 36, a computing device 12-14, a managing unit 18 or an integrity processing unit 20. In this DSN, encoded data slices may be encrypted using keys that may change for a variety of reasons. For example, when the encryption key is no longer valid, it may be changed to no encryption key or a new encryption key. As another example, the encryption for one or more sets of the encrypted encoded data slices may change according to a DSN policy. For example, the DSN policy may indicate when keys are no longer valid. As another example, the DSN policy may indicate a time frame for changing keys. As a further example, the encryption key may be changed according to a command (e.g., from a managing unit). Note the keys and the timeframe for changing keys may also vary from set to set, vault to vault, etc.

An encryption key may be used to encrypted one or more encoded data slices. For example, one encryption key may be used to encrypt one encoded data slice. As another example, one encryption key may be used to encrypt a set of encoded data slices. As yet another example, one encryption key may be used to encrypt a plurality of sets of encoded data slices (e.g., a data object). As a further example, one encryption key may be used to encrypt all encoded data slices in a logical container (e.g., a portion of a vault). As a still further example, one encryption key may be used to encrypt all encoded data slices in a vault.

In an example of operation, a set of previously encrypted encoded data slices (e.g., EDS 1_1_a-EDS 5_1_a) are stored in a set of storage units 36. An encryption change occurs or is about to occur in the DSN. For example, the DSN policy indicates the time frame for changing keys is approaching. The DS processing unit 90 obtains a plurality of keys 95 from a computing device of the DSN (e.g., a managing unit 18). Note the DS processing unit 90 may obtain less than a plurality of keys 95 when one key is all that is needed for the encryption change. For example, when all encoded data slices in a vault use one key, and the key for the vault is changing, the DS processing unit may obtain one key.

The DS processing unit 90 selects one or more keys from the plurality of keys 95 and updates an encryption file using the one or more keys. The encryption file includes information regarding one or more of a level of encryption (e.g., slice level), encryption keys (e.g., key 1_1_a-key 5_1_a) for the set of encrypted encoded data slices (e.g., EDS 1_1_a-EDS 5_1_a), and encryption key identifiers (e.g., ID 1_1_a-ID 5_1_a). Having updated the encryption file, the DS processing unit 90 dispersed storage error encodes the updated encryption file into a set of encoded encrypted file slices (EEFSs) 94 and stores the EEFSs 94 in storage units 36 of the DSN.

In this example, each storage unit 36 includes an agent module 92. The agent module 92 is operable to re-encrypt encrypted encoded data slice(s) stored in the storage units. In an example of operation, a first agent module 92 operable in a first storage unit 36 (e.g., storing encrypted encoded data slice 1_1_a) determines to retrieve at least a decode threshold number of encoded encrypted file slices 94 from the storage units 36. For example, the determining may be based on the DSN policy indicating to use a new encryption key for the encrypted encoded data slice. As another example, the determining may be based on the DSN policy indicating encoded data slices encrypted by a flagged encryption key should be re-encrypted. As a further example, determining the encrypted encoded data slice has a key that is no longer valid (e.g., during a read operation, during a decryption process, etc.). As a yet further example, the determination may be made by interpreting that a current time is within the time frame of a DSN policy for changing keys.

Having retrieved the at least a decode threshold number of encoded encrypted file slices, the first agent module 92 decodes and decrypts the encoded encrypted file slices to recover the updated encryption file. The updated encryption file includes one or more of a level of encryption, new encryption keys for the set of encrypted encoded data slices, new encryption key identifiers associated with the new encryption keys, and previous encryption file information.

The first agent module 92 uses the previous file information (e.g., old encryption key, old level of encryption, etc.) to decrypt the encrypted encoded data slice EDS 1_1_a to produce an encoded data slice. The first agent module 92 determines a new encryption key 1_1_a for the encoded data slice based on a new encryption key identifier 1_1_a.

Having determined the new encryption key for encrypted encoded data slice EDS 1_1_a, the agent module encrypts the encoded data slice to produce a re-encrypted encoded data slice EDS' 1_1_a. The agent module 92 then facilitates storage of the re-encrypted encoded data slice EDS' 1_1_a along with the new encryption key identifier 1_1_a in the first storage unit 36. Alternatively, the agent module 92 may determine to send the re-encrypted encoded data slice EDS' 1_1_a to a different storage unit of the set of storage units. Note a second agent module may also be operable in a second storage unit to perform a similar function as the first agent module in the above example.

Figure 9B:
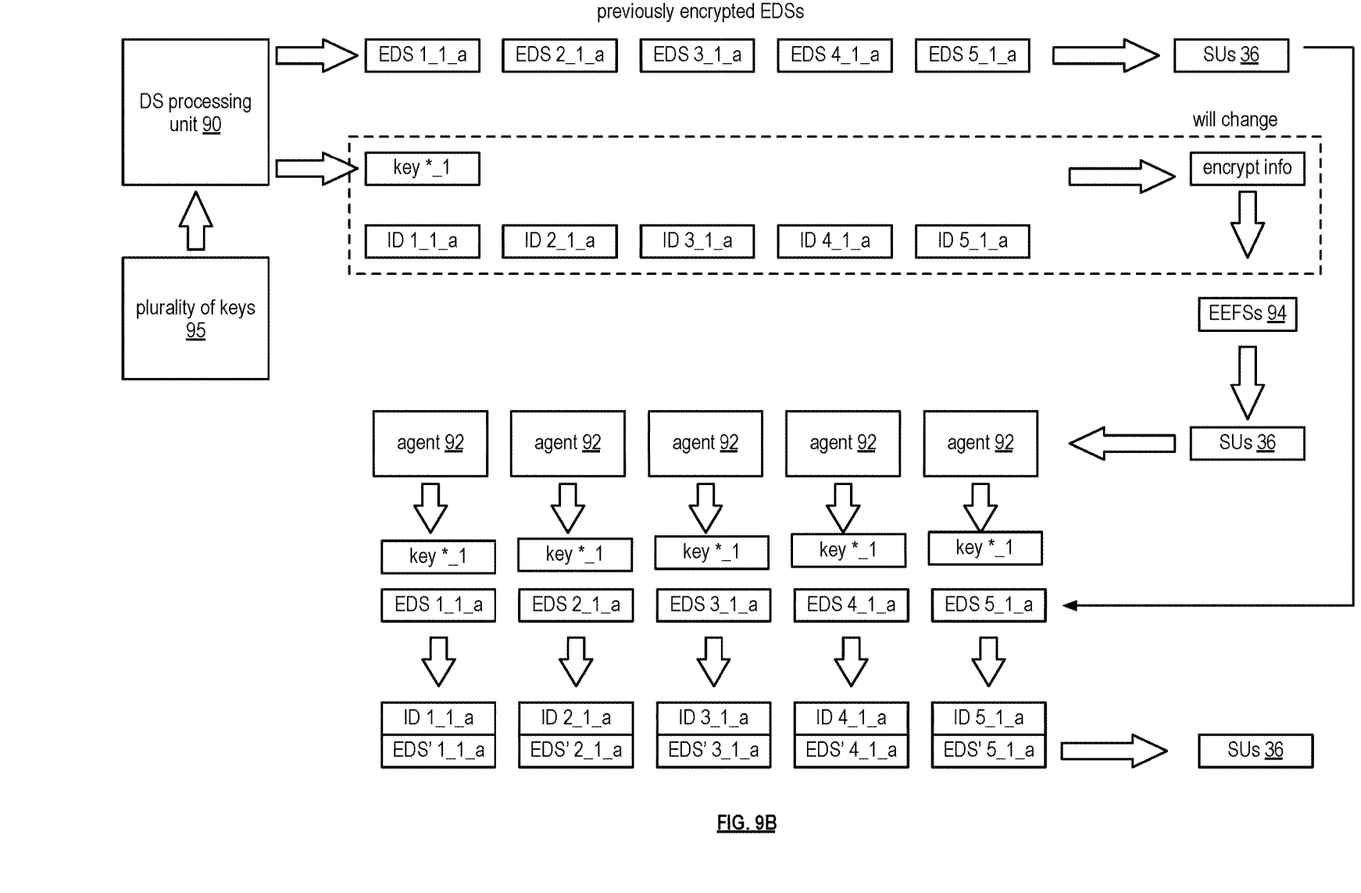
FIG. 9B is a schematic block diagram of another embodiment of re-encrypting encoded data slices within a dispersed storage network (DSN) in accordance with the present invention.

FIG. 9B is a schematic block diagram of previously encrypted encoded data slices and re-encrypted encoded file slices within a dispersed storage network (DSN). In an example of operation, an encryption change occurs in the DSN. For example, a DSN policy indicates the set of keys 1_1_a-5_1_a of FIG. 9A are no longer valid. Having determined the encryption change, the DS processing unit 90 obtains a plurality of keys 95 (alternatively only key *_1) from a computing device of the DSN (e.g., a managing unit 18).

The DS processing unit 90 selects key *_1 and uses key *_1 to update the encryption file to include the level of encryption (e.g., segment level), the new encryption key (e.g., key *_1), a set of encryption key identifiers (e.g., ID 1_1_a-ID 5_1_a), and previous encryption file information (e.g., the encryption file of FIG. 9A). Having updated the encryption file, the DS processing unit 90 dispersed storage error encodes the updated encryption file into a set of encrypted encoded file slices (EEFSs) 94 and stores the EEFSs 94 in storage units 36 of the DSN.

The agent modules then re-encrypts the set of encoded data slices (EDS 1_1_a-EDS 5_1_a) in a process similar to FIG. 9A, except the key *_1 is the same for each encrypted encoded data slice. In this example, a first agent module operable in a first storage unit 36 retrieves at least a decode threshold number of encoded encrypted encoded file slices 94 from the storage units 36. The first agent module 92 decodes and decrypts the encoded encrypted file slices to recover the updated encryption file. The first agent module 92 then sends the updated encryption file to the other agent modules 92. Alternatively, each agent module retrieves, decodes, and decrypts EEFSs 94 to each recover the updated encryption file. The agent modules 92 then facilitate storage of the re-encrypted encoded data slices EDS' 1_1_a-EDS' 5_1_a along with the new encryption key identifiers 1_1_a-5_1_a in storage units 36.

Figure 10:
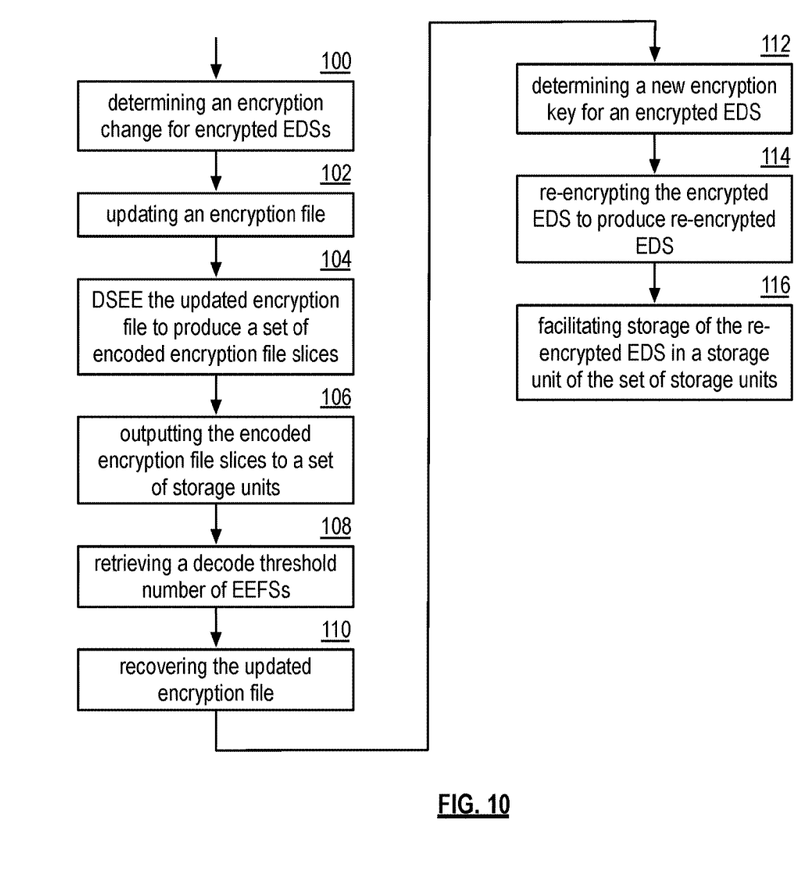
FIG. 10 is a logic diagram of an example of a method of re-encrypting encrypted encoded data slices in accordance with the present invention.

FIG. 10 is a logic diagram of a method of re-encrypting encrypted encoded data slices in response to determining an encryption change in a dispersed storage network (DSN). The method begins with step 100, where a dispersed storage (DS) processing unit of the DSN determines an encryption change regarding one or more sets of encrypted encoded data slices stored in storage units of the DSN. The determination may be made according to a DSN policy. For example, the DSN policy may indicate when keys are no longer valid. As another example, the DSN policy may be a command from a managing unit to change encryption.

The method continues to step 102, where the DS processing unit updates an encryption file based on the encryption change to produce an updated encryption file. The updated encryption file includes information regarding one or more of a level of encryption, one or more new encryption keys for the one or more sets of encrypted encoded data slices, one or more new encryption key identifiers associated with the one or more new encryption keys, and previous encryption file information.

The level of encryption includes one of a vault level, a container level, an object level, a region level, a segment level, a source level and a slice level. For example, when the level the vault level, the DS processing unit updates the encryption file to include a new vault encryption key for the one or more sets of encrypted encoded data slices and a new vault encryption key identifier for the vault encryption key. As another example, when the level of encryption is the slice level, the DS processing unit updates the encryption file to include one or more sets of new encryption keys for the one or more sets of encrypted encoded data slices and one or more sets of new encryption key identifiers for the one or more sets of new encryption keys.

Having produced the updated encryption file, the method continues with step 104, where the DS processing unit dispersed storage error encodes the updated encryption file to produce a set of encoded encryption file slices. The method continues with step 106, where the DS processing unit sends the set of encoded encryption file slices to a set of storage units of the DSN.

The method continues with step 108, where an agent module of the DSN retrieves at least a decode threshold number of encoded encryption file slices of the set of encoded encryption file slices from at least some storage units of the set of storage units. The method continues with step 110, where the agent module recovers the updated encryption file from the least a decode threshold number of encoded encryption file slices. The method continues with step 112, where the agent module determines a new encryption key of the one or more new encryption keys. For example, the determination may be based on an encryption key identifier of the one or more new encryption key identifiers for an encrypted encoded data slice of the one or more sets of encrypted encoded data slices.

The method continues with step 114, where the agent module re-encrypts the encrypted encoded data slice based on the new encryption key to produce a re-encrypted encoded data slice. For example, the agent module decrypts the encrypted encoded data slice using an old encryption key to recover an encoded data slice and encrypts the recovered encoded data slice to produce a re-encrypted encoded data slice. As an example, after re-encrypting, the agent module may confirm the updating of the encryption file for the re-encrypted encoded data slice (e.g., setting a flag, deleting old key, etc.). The method continues with step 116, where the agent module facilitates storage of the re-encrypted encoded data slice in a storage unit of the set of storage units. For example, the agent module sends the re-encrypted encoded data slice to local memory of the storage unit. Note the storage unit may include the agent module.

Figure 11:
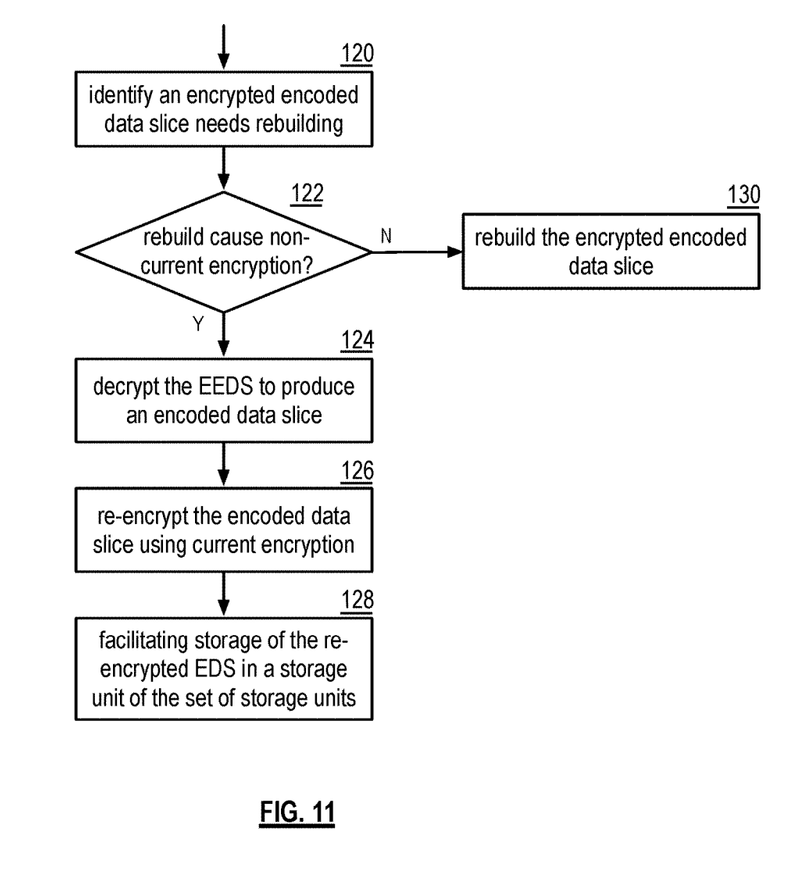
FIG. 11 is a logic diagram of an example of determining a rebuilding cause for encrypted encoded data slices in accordance with the present invention.

FIG. 11 is a logic diagram of an example of determining a rebuilding cause for one or more encrypted encoded data slices. The method begins with step 120, where an agent module of a dispersed storage network (DSN) identifies an encrypted encoded data slice needs rebuilding. Note an integrity processing unit, managing unit, or computing device may also identify the encrypted encoded data slice that needs rebuilding and send information regarding the encrypted encoded data slice that needs rebuilding to the agent module.

The method continues to step 122, where the agent module determines whether a rebuild cause for the encrypted encoded data slice that needs rebuilding is the encrypted encoded data slice has a non-current encryption. When the rebuild cause is not the non-current encryption, the method continues to step 130, where the agent module facilitates rebuilding the encrypted encoded data slice. As an example, the facilitating may include sending the encrypted encoded data slice to an integrity processing unit for rebuilding. As another example, the agent module rebuilds the encrypted encoded data slice.

When the rebuild cause is the non-current encryption, the method continues to step 124, where the agent module decrypts the encrypted encoded data slice to produce an encoded data slice. The method continues to step 126, where the agent module re-encrypts the encoded data slice using the current encryption to produce a re-encrypted encoded data slice. The method continues to step 128, where the agent module facilitates storage of the re-encrypted encoded data slice to DSN memory. For example, the agent module sends the re-encrypted encoded data slice to a storage unit of the set of storage units of the DSN.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:

in accordance with a DSN policy, determining, by a dispersed storage (DS) processing unit of a dispersed storage network (DSN), an encryption change regarding one or more sets of encrypted encoded data slices stored in storage units of the DSN;

updating, by the DS processing unit, an encryption file in accordance with the encryption change to produce an updated encryption file, wherein the updated encryption file includes information regarding one or more of: a level of encryption, one or more new encryption keys for the one or more sets of encrypted encoded data slices, one or more new encryption key identifiers associated with the one or more new encryption keys, and previous encryption file information, wherein one or more sets of encoded data slices were encrypted in accordance with the encryption file to produce the one or more sets of encrypted encoded data slices;

dispersed storage error encoding, by the DS processing unit, the updated encryption file to produce a set of encoded encryption file slices;

outputting, by the DS processing unit, the set of encoded encryption file slices to a set of storage units of the DSN;

retrieving, by an agent module of the DSN, at least a decode threshold number of encoded encryption file slices of the set of encoded encryption file slices from at least some storage units of the set of storage units;

recovering, by the agent module, the updated encryption file from the at least a decode threshold number of encoded encryption file slices;

determining, by the agent module, a new encryption key of the one or more new encryption keys based on an encryption key identifier of the one or more new encryption key identifiers for an encrypted encoded data slice of the one or more sets of encrypted encoded data slices;

re-encrypting, by the agent module, the encrypted encoded data slice based on the new encryption key to produce a re-encrypted encoded data slice; and facilitating, by the agent module, storage of the re-encrypted encoded data slice in a storage unit of the set of storage units.

2. The method of claim 1, wherein the level of encryption comprises one of:
vault level;
container level;
object level;
region level;
segment level;
source level; and
slice level.

3. The method of claim 2 further comprises:
when the level of encryption is the vault level, updating the encryption file to include a new vault encryption key for the one or more sets of encrypted encoded data slices and a new vault encryption key identifier for the new vault encryption key; and
when the level of encryption is the slice level, updating the encryption file to include one or more sets of new encryption keys for the one or more sets of encrypted encoded data slices and one or more sets of new encryption key identifiers for the one or more sets of new encryption keys.

4. The method of claim 1, wherein the DSN policy comprises one or more of:

an indication of when keys are no longer valid;
a time frame for changing keys; and
a command from a managing unit.

5. The method of claim 1 further comprises:
determining, by the agent module, to retrieve the at least a decode threshold number of encoded encryption file slices by one or more of:
determining, based on the DSN policy, to use a new encryption key for the encrypted encoded data slice;
determining, based on the DSN policy, encoded data slices encrypted by a flagged encryption key should be re-encrypted; and
determining the encrypted encoded data slice has a key that is no longer valid.

6. The method of claim 1 further comprises:
after re-encrypting, confirming, by the agent module, the updating of the encryption file for the re-encrypted encoded data slice.

7. The method of claim 1 further comprises:
identifying, by the agent module, the encrypted encoded data slice that needs rebuilding;
determining, by the agent module, whether a rebuild cause for the encrypted encoded data slice that needs rebuilding is a non-current encryption; and
when the rebuild cause is the non-current encryption:
decrypting the encrypted encoded data slice to produce an encoded data slice;
re-encrypting the encoded data slice using a current encryption to produce a re-encrypted encoded data slice; and
sending the re-encrypted encoded data slice to DSN memory for storage.

8. The method of claim 1 further comprises:
retrieving, by a second agent module of the DSN, at least the decode threshold number of encoded encryption file slices of the set of encoded encryption file slices from the at least some storage units of the set of storage units;
recovering, by the second agent module, the updated encryption file from the at least a decode threshold number of encoded encryption file slices;
determining, by the second agent module, a new encryption key of the one or more new encryption keys based on the encryption key identifier of the one or more new encryption key identifiers for a second encrypted encoded data slice of the one or more sets of encrypted encoded data slices;
re-encrypting, by the second agent module, the second encrypted encoded data slice based on the new encryption key to produce a second re-encrypted encoded data slice; and
facilitating, by the second agent module, storage of the second re-encrypted encoded data slice in a second storage unit of the set of storage units.

9. The method of claim 1, wherein the facilitating storage of the re-encrypted encoded data slice in a storage unit of the set of storage units comprises:
sending, by the agent module, the re-encrypted encoded data slice to local memory of the storage unit, wherein the storage unit includes the agent module.

10. The method of claim 1, wherein the re-encrypting the encrypted encoded data slice comprises:
decrypting the encrypted encoded data slice using an old encryption key to recover an encoded data slice; and
encrypting the recovered encoded data slice to produce the re-encrypted encoded data slice.

11. A computer readable memory device comprises:
a first memory section for storing operational instructions that, when executed by a dispersed storage (DS) processing unit of a dispersed storage network (DSN), causes the DS processing unit to:
in accordance with a DSN policy, determine an encryption change regarding one or more sets of encrypted encoded data slices stored in storage units of the DSN;
update an encryption file in accordance with the encryption change to produce an updated encryption file, wherein the updated encryption file includes information regarding one or more of: a level of encryption, one or more new encryption keys for the one or more sets of encrypted encoded data slices, one or more new encryption key identifiers associated with the one or more new encryption keys, and previous encryption file information, wherein one or more sets of encoded data slices were encrypted in accordance with the encryption file to produce the one or more sets of encrypted encoded data slices;
dispersed storage error encode the updated encryption file to produce a set of encoded encryption file slices;
output the set of encoded encryption file slices to a set of storage units of the DSN;
a second memory section for storing operational instructions that, when executed by an agent module of the DSN, causes the agent module to:
retrieve at least a decode threshold number of encoded encryption file slices of the set of encoded encryption file slices from at least some storage units of the set of storage units;
recover the updated encryption file from the at least a decode threshold number of encoded encryption file slices;
determine a new encryption key of the one or more new encryption keys based on an encryption key identifier of the one or more new encryption key identifiers for an encrypted encoded data slice of the one or more sets of encrypted encoded data slices;
re-encrypt the encrypted encoded data slice based on the new encryption key to produce a re-encrypted encoded data slice; and
facilitate storage of the re-encrypted encoded data slice in a storage unit of the set of storage units.

12. The computer readable memory device of claim 11, wherein the level of encryption comprises one of:
vault level;
container level;
object level;
region level;
segment level;
source level; and
slice level.

13. The computer readable memory device of claim 12 further comprises:
a third memory section for storing operational instructions that, when executed by the DS processing unit, causes the DS processing unit to:
when the level of encryption is the vault level, update the encryption file to include a new vault encryption key for the one or more sets of encrypted encoded data slices and a new vault encryption key identifier for the new vault encryption key; and
when the level of encryption is the slice level, update the encryption file to include one or more sets of new encryption keys for the one or more sets of encrypted encoded data slices and one or more sets of new encryption key identifiers for the one or more sets of new encryption keys.

14. The computer readable memory device of claim 11, wherein the DSN policy comprises one or more of:
an indication of when keys are no longer valid;
a time frame for changing keys; and
command from a managing unit.

15. The computer readable memory device of claim 11 further comprises:
a fourth memory section for storing operational instructions that, when executed by the agent module, causes the agent module to:
determine to retrieve the at least a decode threshold number of encoded encryption file slices by one or more of:
determining, based on the DSN policy, to use a new encryption key for the encrypted encoded data slice;
determining, based on the DSN policy, encoded data slices encrypted by a flagged encryption key should be re-encrypted; and
determining the encrypted encoded data slice has a key that is no longer valid.

16. The computer readable memory device of claim 11, wherein the second memory section stores further operational instructions that, when executed by the agent module, causes the agent module to:
after re-encrypting, confirm the updating of the encryption file for the re-encrypted encoded data slice.

17. The computer readable memory device of claim 11, wherein the second memory section stores further operational instructions that, when executed by the agent module, causes the agent module to:
identify the encrypted encoded data slice needs rebuilding;
determine whether a rebuild cause for the encrypted encoded data slice that needs rebuilding is a non-current encryption; and
when the rebuild cause is the non-current encryption:
decrypt the encrypted encoded data slice to produce an encoded data slice;
re-encrypt the encoded data slice using the current encryption to produce a re-encrypted encoded data slice; and
send the re-encrypted encoded data slice to DSN memory for storage.

18. The computer readable memory device of claim 11 further comprises:
a fifth memory section for storing operational instructions that, when executed by a second agent module of the DSN, causes the second agent module to:
retrieve at least the decode threshold number of encoded encryption file slices of the set of encoded encryption file slices from the at least some storage units of the set of storage units;
recover the updated encryption file from the at least a decode threshold number of encoded encryption file slices;
determine the new encryption key of the one or more new encryption keys based on the encryption key identifier of the one or more new encryption key identifiers for a second encrypted encoded data slice of the one or more sets of encrypted encoded data slices;
re-encrypt the second encrypted encoded data slice based on the new encryption key to produce a second re-encrypted encoded data slice; and facilitate storage of the second re-encrypted encoded data slice in a second storage unit of the set of storage units.

19. The computer readable memory device of claim 11, wherein the second memory section stores further operational instructions that, when executed by the agent module, causes the agent module to facilitate storage of the re-encrypted encoded data slice in a storage unit of the set of storage units by:
sending the re-encrypted encoded data slice to local memory of the storage unit, wherein the storage unit includes the agent module.

20. The computer readable memory device of claim 11, wherein the second memory section stores further operational instructions that, when executed by the agent module, causes the agent module to re-encrypt the encrypted encoded data slice by:
decrypting the encrypted encoded data slice using an old encryption key to recover an encoded data slice; and
encrypting recovered encoded data slice to produce the re-encrypted encoded data slice.

* * * * *